United States Patent [19]

Morimoto

[11] Patent Number: 4,471,658

[45] Date of Patent: Sep. 18, 1984

[54] ELECTROMAGNETIC ACOUSTIC TRANSDUCER

[75] Inventor: Kazuo Morimoto, Takasago, Japan

[73] Assignee: Mitsubishi Jukogyo Kabushiki Kaisha, Tokyo, Japan

[21] Appl. No.: 415,906

[22] Filed: Sep. 8, 1982

[30] Foreign Application Priority Data

Sep. 22, 1981 [JP] Japan ................................ 56-149792
Feb. 2, 1982 [JP] Japan ............................ 57-13232[U]

[51] Int. Cl.³ ............................................ G01N 29/04
[52] U.S. Cl. ...................................... 73/643; 324/232; 324/220
[58] Field of Search .................. 73/643; 324/232, 219, 324/220

[56] References Cited

U.S. PATENT DOCUMENTS 4,127,035 11/1978 Vasile .................................. 73/643
4,218,924 8/1980 Fortunico et al. ..................... 73/643
4,232,557 11/1980 Vasile .................................. 73/643

FOREIGN PATENT DOCUMENTS 2655804 6/1978 Fed. Rep. of Germany ........ 73/643
56-21058 2/1981 Japan .................................... 73/643

*Primary Examiner*—Anthony V. Ciarlante
*Attorney, Agent, or Firm*—Birch, Stewart, Kolasch & Birch

[57] ABSTRACT

An improved electromagnetic acoustic transducer essentially which comprises supports located at both the ends of a core assembly, a plurality of ferrite members, a plurality of permanent magnets or electromagnets and a plurality of coils wound around the core assembly, said combination functioning to inspect for any defect in a tubing having a small diameter.

6 Claims, 7 Drawing Figures

ELECTROMAGNETIC ACOUSTIC TRANSDUCER

The present invention relates to an improved electromagnetic acoustic transducer which is used for the purpose of inspecting for defects in a tubing, piping or the like using an ultrasonic wave.

A typical hitherto known electromagnetic acoustic transducer (hereinafter referred to simply as EMAT) is schematically illustrated in FIG. 1 which is constructed such that an ultrasonic wave defect inspection can be performed by inserting it into a tubing having a small diameter (hereinafter referred to simply as tubing). To facilitate an understanding of the present invention, the illustrated conventional EMAT will be briefly described below.

In the drawing reference number 1 designate a plurality of permanent magnets which are arranged one after another in such a configuration that each of their poles are located opposite to one another. Further, a coil 2 is wound around a group of permanent magnets (for instance, five pieces of permanent magnets in the illustrated case) to form a single unit. Thus, the EMAT generally identified by reference numeral 3 is obtained. Reference numeral 4 designates a tubing into which the EMAT 3 is inserted.

Next, the operation of the EMAT will be described with reference to FIG. 2.

As the coil 2 in the EMAT 3 is fed with high frequency electric current, an eddy current I is generated in the tubing 4 which is closely spaced from the coil 2. On the other hand, magnetic flux B is emitted from the permanent magnets 1, said magnetic flux B extending at a right angle relative to the inner surface of the tubing and varying periodically, whereby a Lorentz force F is produced as a result of mutual interaction of the eddy current I and the magnetic flux B. The Lorentz force F varies at the same period as that of the magnetic flux and an ultrasonic wave (shear wave) is generated in the tubing 4 by Lorentz force. It should be noted that detection of the ultrasonic wave can be transformed into an electrical signal by way of the reverse steps relative to those in the foregoing.

However, since the aforesaid conventional EMAT is constructed such that an ultrasonic wave is generated only on a part of the tubing which is located corresponding to the coil 2, it is pointed out, as a drawback inherent to the conventional EMAT, that there is a necessity for rotating either the tubing or the EMAT so as to ensure complete inspection over the entire tubing 4 which makes the inspection complicated. Furthermore, another drawback is that there is unavoidably created an area where the outer surface of the coil 2 is spaced from the inner surface of the tubing 4 due to the geometrical configuration of the permanent magnets 1, resulting in a reduction in the efficiency in the generation of an ultrasonic wave and degraded sensibility.

Thus, the present invention is intended to obviate the drawbacks inherent in the conventional EMAT as described above. Accordingly, it is an object of the present invention to provide an improved eletromagnetic acoustic transducer which is able to generate an ultrasonic wave over the entire periphery of the tubing to be inspected at a high efficiency by producing a Lamb wave consisting of a shear wave component at a right angle relative to the inner surface of the tubing without any necessity for rotating the tubing.

Other objects and advantageous features of the present invention will be readily understood from the reading of the following description made in conjunction with the accompanying drawings.

The accompanying drawings will be briefly described below.

Now the present invention will be described in greater detail with reference to the accompanying drawings which illustrate the preferred embodiments of the invention.

Figure 1:
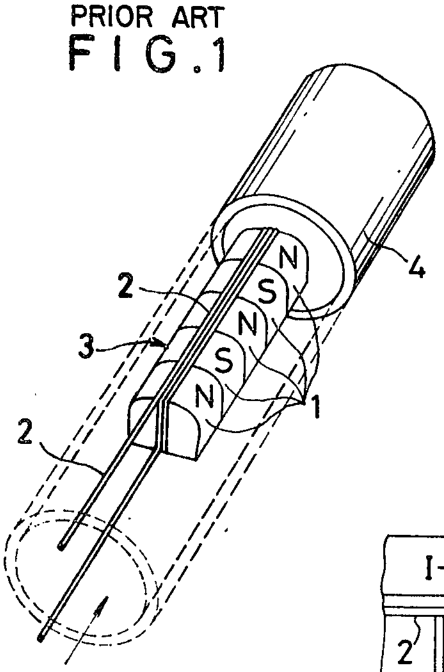
PRIOR ART FIG.1
FIG. 1 is a schematic perspective view of a typical conventional EMAT.
Figure 2:
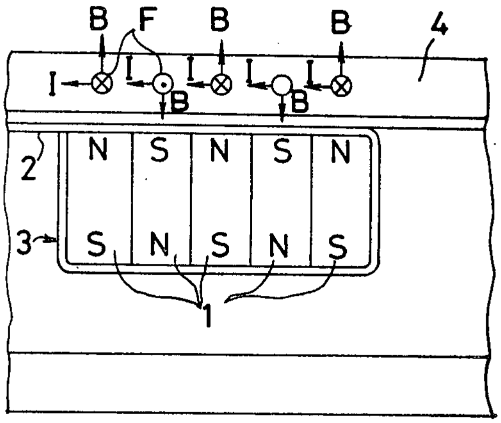
PRIOR ART FIG.2
FIG. 2 is a partial sectional view schematically illustrating the operation of the conventional EMAT.
Figure 3:
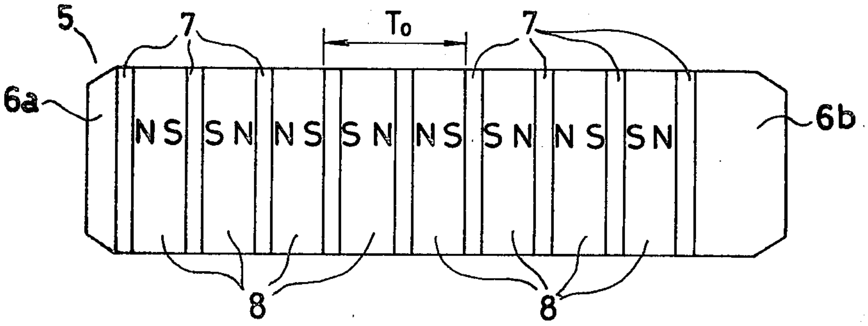
FIG. 3 is a front view of a core assembly of an improved EMAT in accordance with a preferred embodiment of the present invention, said core assembly being shown with the coils removed therefrom.
Figure 4:
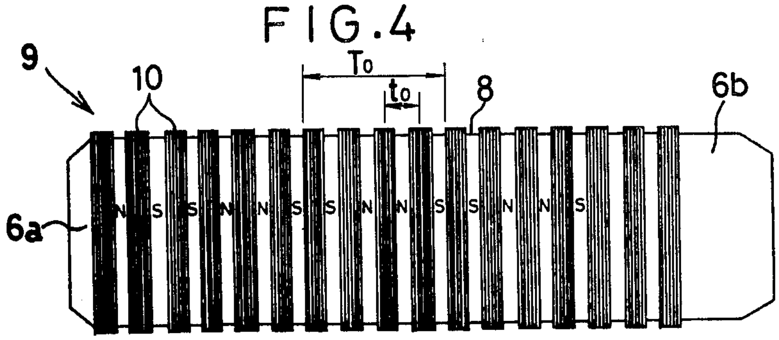
FIG. 4 is a front view of the core assembly for the improved EMAT in FIG. 3 with the coils wound therearound.
Figure 5:
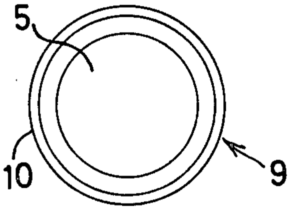
FIG. 5 is an axial view of the core assembly in FIG. 3.

Referring first to FIGS. 3 to 5, a core assembly of an electromagnetic acoustic transducer (hereinafter referred to simply as EMAT) is generally identified by reference numeral 5. Specifically, the core assembly 5 is constructed by a combination of cylindrical supports $6_a$ and $6_b$, a plurality of ferrite members 7 and a plurality of magnets 8, said ferrite members 7 and magnets 8 being alternately arranged between both the cylindrical supports $6_a$ and $6_b$ in the same manner as in FIG. 3.

It should be noted that the respective magnets 8 are arranged in such a manner that same polarities are located opposite to one another over the ferrite member 7 interposed therebetween. Furthermore, an arrangement pitch ($T_o$) of the ferrite members 7 and the magnets 8 is dimensioned equal to the wave length $\lambda$ of the ultrasonic wave generated by EMAT 9. As is apparent from FIGS. 4 and 5, a number of coils 10 are wound around both the ferrite members 7 and the magnets 8. It should be noted that the center distance $t_o$ between the adjacent coils 10 is dimensioned equal to $T_o/4$ $(=\lambda/4)$ and the respective coils 10 are connected in series.

Figure 6:
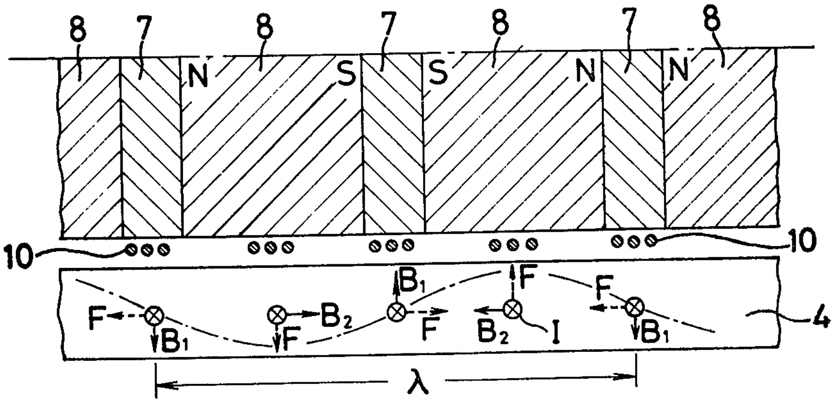
FIG. 6 is a partial sectional view schematically illustrating the operation of the improved EMAT in accordance with the present invention, shown in an enlarged scale.

Next, the operation of inserting EMAT 9 into a tubing 4 having a small diameter (hereinafter referred to simply as tubing) will be described below with reference to FIG. 6. When EMAT 9 is inserted into the tubing 4, a magnetic flux $B_1$ is produced in a portion of the tubing 4 corresponding to the respective ferrite members 7, said magnetic flux $B_1$ extending at right angles relative to the inner surface of the tubing 4, whereas another magnetic flux $B_2$ is produced in another portion of the tubing 4 corresponding to the middle part of the respective magnets 8, said magnetic flux $B_2$ extending in parallel to the axis of the tubing 4.

As high frequency electric current is fed through the coils 10, an eddy current I is generated in the tubing 4 by way of electromagnetic induction, said eddy current I flowing in parallel to the direction of connection of the tubing 4. Thus, a Lorentz force F is produced in the tubing 4 as a result of the interaction between the aforesaid eddy current I and magnetic fluxed $B_1$ and $B_2$. It should be noted that the direction of the Lorentz force F is rotated at the same period as the period $T_o$ of distribution of magnetic fluxes.

As a result, an ultrasonic wave (as identified by a chain line in FIG. 6) is produced on the periphery of the tubing 4 by the aforesaid Lorentz force F, said ultrasonic wave serving to transmit a shear wave which is called Lamb wave shear wave includes a shear wave component at a right angle relative to the inner surface of the tubing 4. The wave is transmitted in the tubing 4 and comes backs after it is reflected by certain defects in the tubing 4. Then, the received ultrasonic wave is transformed into an electrical signal by way of the reverse process, whereby the existence of the defect in the tubing 4 is inspected.

Figure 7:
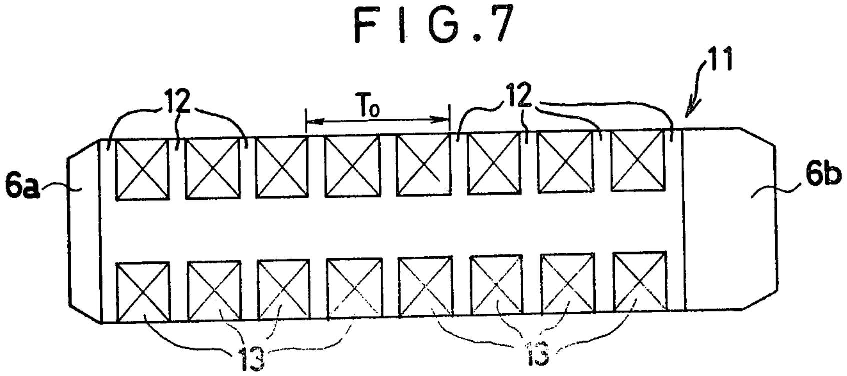
FIG. 7 is a front view of a core assembly for an improved EMAT in accordance with a modified embodiment of the present invention, wherein the permanent magnets in the preceding embodiment are replaced with electromagnets.

Obviously, it is possible that the present invention can be practiced by employing permanent magnets for the aforesaid magnets in EMAT in the above-described embodiment. However, the present invention should not be limited only to permanent magnets and thus electromagnets may also be useable therefor. Thus a modified embodiment of the present invention in which electromagnets are employed, will now be described below with reference to FIG. 7.

In the drawing a core assembly of EMAT is generally identified by reference numeral 11. Specifically, the core assembly 11 is constructed by with a combination of cylindrical supports $6_a$ and $6_b$, a plurality of ferrite members 12 and a plurality of electromagnets 13, said ferrite members 12 and electromagnets 13 being alternately disposed between both the cylindrical supports $6_a$ and $6_b$. The electromagnets 13 are arranged in such a manner that the same polarities are located opposte to one another with the ferrite member 12 interposed therebetween when coils (not shown) wound therearound are energized. Further, the arrangement pitch ($T_o$) of the ferrite members 12 and the magnets 13 is dimensioned equal to the wave length λ of the ultrasonic wave generated by EMAT. A plurality of coils 10 (not shown) are wound around the periphery of both the ferrite members 12 and the electromagnets 13 in quite the same manner as shown in FIGS. 4 and 5. It should be noted that a center distance $t_o$ between the adjacent coils 10 is dimensioned equal to $T_o/4$.

A specific advantageous feature of EMAT in accordance with the modified embodiment of the present invention as constructed in the above-described manner is that the EMAT is readily inserted into the tubing made of magnetic material (not shown) and further displaced therein due to no magnetic attractive force produced by the electromagnets 13 of which coils are not energized. After EMAT is inserted to a predetermined position in the tubing, the coils of the electromagnets 13 are energized so as to produce a magnetic field whereby generation of the ultrasonic wave and defect inspection are performed. It should be noted that the mechanism for generation of the ultrasonic waves and the inspection is the same as that illustrated in FIG. 6.

Typical advantageous features of EMAT in accordance with the present invention are as follows:

(1) Since the ferrite members and the magnets are designed in the form of a disc or cylinder, there is a close clearance between the periphery of the EMAT and the inner surface of a tubing to be inspected, when the former is inserted into the latter. Thus, an ultrasonic wave is generated over the whole inner surface of the tubing due to the close arrangement of EMAT relative to the tubing and thus an inspection of the defects in the tubing is easily performed without any necessity for performing the complicated operation of rotation of the EMAT or the tubing.

(2) All of the coils around the EMAT are located close to the inner surface of the tubing when the EMAT is inserted into the tubing, whereby eddy currents produced by the coils becomes effective in generating an ultrasonic wave in the wall of the tubing. Thus, it is ensured that an ultrasonic wave is generated at a high efficiency and an increased sensibility is attained for the inspection.

In the illustrated embodiments of the present invention a single EMAT is utilized both for generation of Lamb shear wave and the inspection, but the present invention should not be limited only to this embodiment and thus the present invention may be utilized exclusively for the generation of Lamb shear wave or for inspection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetic acoustic transducer comprising a cylindrical core assembly and a plurality of coils wound around said core assembly, said core assembly including disc-shaped supports located at both ends thereof, a plurality of ferrite members and a plurality of magnets, said magnets being arranged in such a manner that their magnetic axes are parallel to that of the cylindrical core assembly and their magnetic moments are antiparallel with respect to each other over a ferrite member interposed therebetween; all the said coils being wound in the same direction at the sides of said ferrite members and at that of the central part of said magnets.

2. The electromagnetic acoustic transducer as defined in claim 1, wherein said magnets are permanent magnets.

3. The electromagnetic acoustic transducer as defined in claim 1, wherein said magnets are electromagnets.

4. The electromagnetic acoustic transducer as defined in claim 1, wherein said magnets are arranged such that the arrangement pitch ($T_o$) is dimensioned equal to the period λ of the ultrasonic wave generated thereby.

5. An electromagnetic acoustic transducer for generating an ultrasonic wave over the entire periphery of the material to be inspected by producing a Lamb wave having a shear wave component at a right angle relative to the entire surface of the material which comprises a cylindrical core assembly containing a plurality of ferrite members and a plurality of magnets alternately arranged with respect to each other, said magnets being arranged in such a manner that the same polarities thereof are located opposite to one another with the ferrite member interposed therebetween, and a plurality of coils wound around said core assembly, said core assembly including disc-shaped supports located at both ends thereof, all of said coils being wound in the same direction around both the ferrite member and the magnets, whereby the direction of the electric current is the same for all the coils and the direction of the magnetic field is opposite in neighboring coils so that the direction of the Lorentz force for the neighboring coils is opposite in the material to be inspected.

6. The electromagnetic acoustic transducer of claim 5 wherein the material to be inspected has a tubular configuration and the cylindrical core assembly is disposed within said tubular configuration whereby a close clearance is maintained between the periphery of the core assembly and the inner surface of the tubular material for detecting defects in the tubular material without the necessity of rotating either the core assembly or the tubular material.

* * * * *